United States Patent
Hsu et al.

(10) Patent No.: US 7,491,423 B1
(45) Date of Patent: Feb. 17, 2009

(54) DIRECTED SPATIAL ORGANIZATION OF ZINC OXIDE NANOSTRUCTURES

(75) Inventors: Julia Hsu, Albuquerque, NM (US); Jun Liu, Richland, WA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/414,894

(22) Filed: May 1, 2006

Related U.S. Application Data

(60) Provisional application No. 60/676,930, filed on May 2, 2005.

(51) Int. Cl.
| | |
|---|---|
| B05D 7/00 | (2006.01) |
| B05D 7/14 | (2006.01) |
| B05D 7/24 | (2006.01) |
| B05D 1/18 | (2006.01) |
| B05D 1/28 | (2006.01) |
| B05D 1/32 | (2006.01) |
| B05D 1/36 | (2006.01) |
| C01G 9/02 | (2006.01) |
| C22B 19/34 | (2006.01) |

(52) U.S. Cl. ............ 427/261; 427/287; 427/327; 427/435; 977/811; 977/887; 423/99

(58) Field of Classification Search .......... None
See application file for complete search history.

(56) References Cited

U.S. PATENT DOCUMENTS

| | | | |
|---|---|---|---|
| 6,017,390 A | 1/2000 | Charych et al. | |
| 6,517,802 B1 | 2/2003 | Xiao et al. | |
| 6,541,539 B1 | 4/2003 | Yang et al. | |
| 6,872,645 B2 | 3/2005 | Duan et al. | |
| 6,981,445 B2 | 1/2006 | Cracauer et al. | |
| 6,984,265 B1 | 1/2006 | Raguse et al. | |
| 7,056,409 B2* | 6/2006 | Dubrow ............ | 156/276 |
| 2002/0117659 A1* | 8/2002 | Lieber et al. ............ | 257/14 |

FOREIGN PATENT DOCUMENTS

WO     WO 96/29629 A1 * 9/1996

OTHER PUBLICATIONS

Feng et al., "Reversible Super-hydrophobicity to Super-hydrophilicity Transition of Aligned ZnO Nanorod Films", J. Am. Chem. Soc. 2004, 126, 62-63; published on web Dec. 11, 2003.*

Hsu et al., "Directed Spatial Organization of Zinc Oxide Nanorods," Nano Lett. 2005, 5, 83-86; published on web Dec. 18, 2004.*

Keis et al., "Photoelectrochemical Properties of Nano- to Microstructured ZnO Electrodes," Journal of The Electrochemical Society, 148 (2) A149-A155 (2001).*

Tian et al., "Biometric Arrays of Oriented Helical ZnO Nanorods and Columns," J. Am. Chem. Soc. 2002, 124, 12954-12955.*

Hsu et al., "Directed Spatial Organization of Zinc Oxide Nanorods," Nano. Lett., vol. 5, No. 1, 2005, 83-86.*

Tian et al., "Complex and oriented ZnO nanostructures," Nature Materials, vol. 2, pp. 821-826, Dec. 2003 (published online Nov. 23, 2003).*

T. L. Sounart, "Step-by-Step Hierarchical Growth of Complex ZnO Nanocrystals," presented at 2005 Electronic Materials Conference in Santa Barbara, CA on Jun. 22-24, 2005.

J. W. Hsu, "Directed Spatial Organization of Zinc Oxide Nanorods," Nano Letters, 2005, vol. 5, No. 1, pp. 83-86.

Zu Rong Dai, "Novel Nanostructures of Functional Oxides Synthesized by Thermal Evaporation," Advanced Functional Materials, 2003, 13, No. 1, January.

B. D. Yao, "Formation of ZnO nanostructures by a simple way of thermal evaporation," Applied Physics Letters, Jul. 22, 2002, vol. 81, No. 4, pp. 757-759.

T. L. Sounart. "Sequential Nucleation and Growth of Complex Nanostructured Films," Advanced Functional Materials, 2006, 16, 335-344.

J. Aizenberg, "Control of crystal nucleation by patterned self-assembled monolayers," Nature, vol. 398, Apr. 8, 1999, 495-498.

M. Yan, "Selective-area atomic layer epitaxy growth of ZnO features on soft lithography-patterned substrates," Applied Physics Letters, vol. 79, No. 11, Sep. 10, 2001, pp. 1709-1711.

L. Vayssiees, "Growth of Arrayed Nanorods and Nanowires of ZnO from Aqueous Solutions," Advanced Materials, 2003, 15, No. 5, Mar. 4, pp. 464-466.

M. H. Huang, "Catalytic Growth of Zinc Oxide Nanowires by Vapor Transport," Advanced Materials, 2001, 13, No. 2, Jan. 16, pp. 113-116.

* cited by examiner

*Primary Examiner*—William Phillip Fletcher, III
(74) *Attorney, Agent, or Firm*—Elmer A. Klavetter

(57) ABSTRACT

A method for controllably forming zinc oxide nanostructures on a surface via an organic template, which is formed using a stamp prepared from pre-defined relief structures, inking the stamp with a solution comprising self-assembled monolayer (SAM) molecules, contacting the stamp to the surface, such as Ag sputtered on Si, and immersing the surface with the patterned SAM molecules with a zinc-containing solution with pH control to form zinc oxide nanostructures on the bare Ag surface.

16 Claims, 1 Drawing Sheet

DIRECTED SPATIAL ORGANIZATION OF ZINC OXIDE NANOSTRUCTURES

RELATED APPLICATIONS

Figure 1:
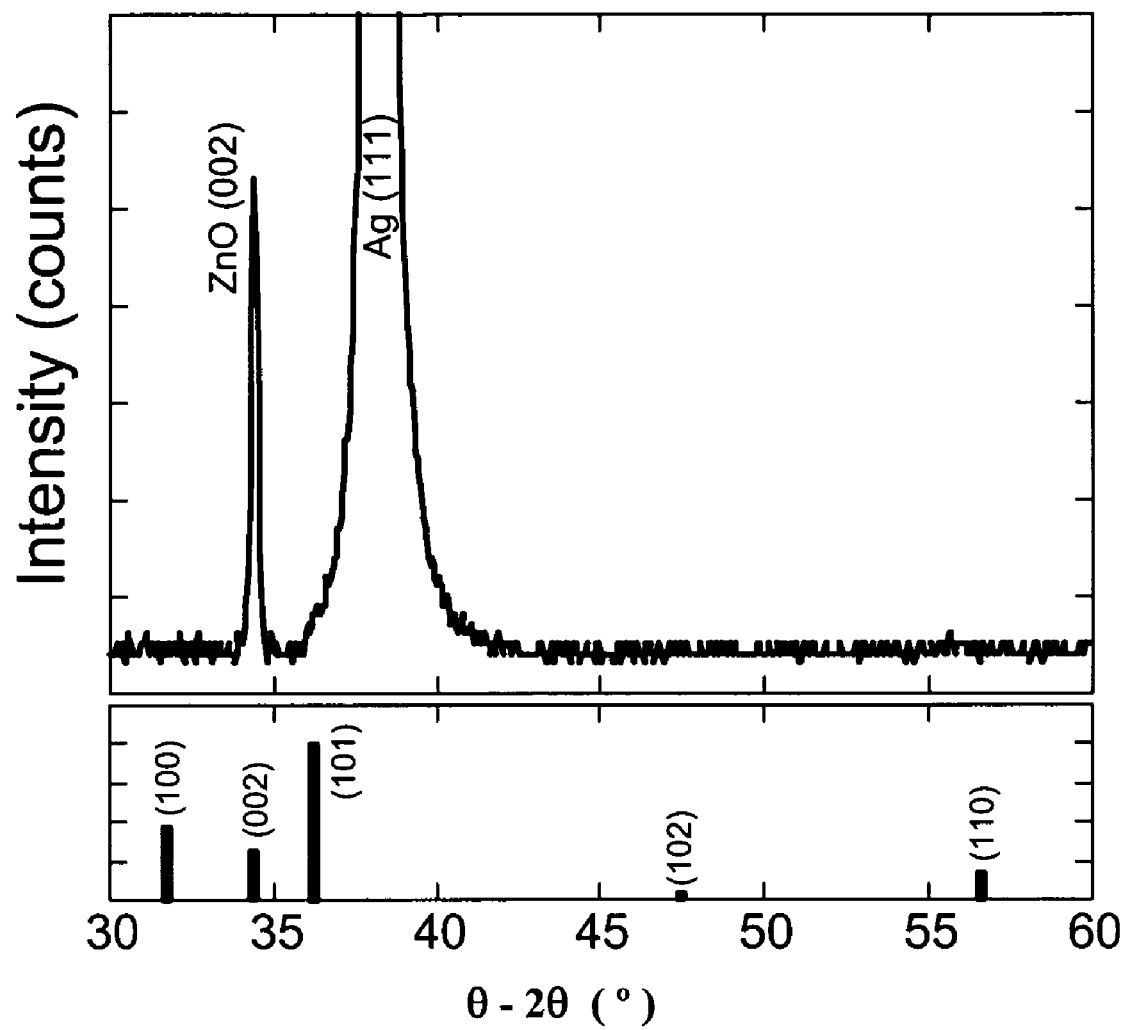

This application claims the benefit of U.S. Provisional Application No. 60/676,930, filed on May 2, 2005.

This invention was made with Government support under Contract No. DE-AC04-94AL85000 awarded by the Department of Energy. The Government has certain rights in the invention.

BACKGROUND OF THE INVENTION

The invention describes a method for making zinc oxide nanostructures on a surface in a definable pattern.

Synthesis and assembly of nanomaterials for new applications are at the forefront of nanoscience and nanotechnology research. Zinc oxide (ZnO) nanostructures have potential uses in many high-technology areas, including optoelectronics, nanomechanics, energy conversion, biochemical sensing, and catalysis, due to the multi-functionality of ZnO bulk properties, such as wide bandgap semiconductors, piezoelectricity, and transparent conductors. Most of ZnO nanostructures have been synthesized at high temperatures by vapor phase techniques, with spatial organization achieved through patterning of metal catalysts. Solution-based crystal growth techniques have advantages of low temperatures and environmentally benign.

Specially tailored organic molecules have been demonstrated to govern the nucleation and growth of inorganic crystals. Using molecules that form self-assembled monolayers (SAMs) to direct crystal growth from solution is particularly attractive because the molecular assembly on surfaces is well characterized and soft lithography techniques can be applied forming patterns down to the nanometer regime. For example, through use of solution-based approach, previous work showed that nucleation location and density, crystal size, morphology, and orientation of calcite crystal on metal surfaces can be controlled with high precision.

BRIEF DESCRIPTIONS OF THE DRAWINGS

FIG. 1 shows an x-ray diffraction pattern of ZnO nanostructures prepared by the method of the present invention.

DESCRIPTION OF SPECIFIC EMBODIMENTS

For the method of the present invention, soft nanolithography is used to create an organic template, which then determines the nucleation of zinc oxide (ZnO) nanorods from aqueous solution on a heterogeneous (silver) surface (T. L. Sounart, J. Liu, J. A. Voigt, J. W. Hsu, B. McKenzie, and E. Spoerke, "Sequential Nucleation and Growth of Complex Nanostructured Films," Advanced Functional Materials, 2006, 16, 335-344; T. L Sounart, J. Liu, J. A. Voigt, J. W. Hsu, B. E. Spoerke, Z. Tian, and Y. B. Jiang, "Step-by-Step Hierarchical Growth of Complex ZnO Nanocrystals," presented at 2005 Electronic Materials Conference in Santa Barbara, Calif. on Jun. 22-24, 2005; J. W. Hsu, Z. Tian, N. Simmons, C. Matzke, J. Voigt and J. Liu, "Directed Spatial Organization of Zinc Oxide Nanorods," Nano Letters, 2005, Vol. 5, No. 1, pp. 83-86; herein incorporated in their entirety). Directed organization of ZnO nanocrystals in a prescribed arbitrary pattern is demonstrated with superb control in selectivity, average density, and crystal orientation. Microcontact printing (μCP) is used to pattern self-assembled monolayer (SAM) molecules on silver (Ag) surfaces to control the nucleation of ZnO nanorods from a dilute aqueous solution at low temperature. The resulting ZnO patterns are determined by the organic template with high-resolution patterns being produced over large areas. Comparing to previous calcite work, both the crystal dimension and the pattern feature size are an order of magnitude smaller.

To chemically pattern a surface (such as a surface comprising silver or silver on a substrate), a stamp containing premade relief structures was inked with acidic, self-assembled organic monolayer (SAM) molecules and the stamp imprinted on the surface. The SAM molecules that contacted the surface were transferred and assembled on the surface to form an organic-templated surface. The templated surface was contacted with a dilute aqueous zinc compound solution with the pH being controlled as ZnO nanorods form at the locations of bare surface regions delineated by the organic template.

Microcontact printing is a technique of patterning structures on a surface by using an elastomeric stamp with relief patterns, that is, regions of elevation compared with surrounding areas. The stamp is inked (onto those regions of elevation) with the material to be patterned and then put into contact with the surface, with transfer of the ink material occurring only in the areas of the relief that come into contact with the surface. A pattern is therefore defined on the surface by the ink material that mimics the elevated regions on the stamp, leaving the rest of surface bare or un-inked. The material being transferred to the surface is essentially a molecular monolayer, with intimate contact of the stamp (typically made from a polymer such as polydimethylsiloxane, PDMS) with the surface necessary.

In one embodiment, to chemically pattern a silver (Ag) surface on a substrate, a polydimethylsiloxane (PDMS) stamp containing relief structures was inked with 11-mercaptoundecanoic acid ($HSC_{10}H_{20}COOH$) SAM molecules and stamped onto the Ag. Other compounds that comprise SAM molecules that can be utilized in the method of the present invention include, but are not limited to, 16-mercaptohexadecanoic acid, 1-dodecanethiol, and 1-hexadecanethiol with the compounds dissolved in a polar solvent such as ethanol or 2-propanol. For other surfaces, one would use molecules with different endgroups. In one embodiment, 1000 Å Ag films were deposited on (001) Si wafers by electron beam evaporation. The masters for the microcontact-printing process were photoresist patterns of Si substrates and the PDMS stamps were from commercially-available suppliers. In this embodiment, the SAM solutions (generally 1-10 mM) was formed by dissolving 11-mercaptoundecanoic acid in ethanol or propanol. To coat the PDMS stamps with SAM molecules, two approaches were used. A drop of SAM solution was deposited on the stamp and blown dry with a dry inert gas or spun dry. The SAM molecules on the portions of PDMS stamp that came into contact with the surface were transferred and assembled on the surface. A monolayer was formed on the surface, as confirmed by ellipsometry measurements and scanning electron microscopy (SEM) analyses.

To grow ZnO nanorods, the organic templated Ag films were then inserted into a dilute aqueous zinc nitrate, such as $Zn(NO_3)_2 \cdot 6H_2O$ or $Zn(NO_3)_2 \cdot 4H_2O$, or more generally, $Zn(NO_3)_2 \cdot nH_2O$, where n is an integer greater than 0, and hexamethylenetetramine (HMT) solution at 50-60° C. ZnO nanorods grown by this method have the wurtzite structure (zincite). There are other modifiers that can be added in addition to the zinc nitrate and HMT, but HMT and zinc nitrate are always in the growth solution. Other modifiers include sodium citrate and diaminopropane; other chemicals to control pH include NaOH, diaminopropane and diethylenetriamine. The SAM changed the surface energy and strongly inhibited the nucleation of ZnO nanorods. Consequently, ZnO nanorods are localized on bare Ag regions that were precisely delineated by the organic template. ZnO nanorods were found only inside the 2-μm width of the ring patterns and not on the surrounding SAM covered regions. In comparison, ZnO nanorods grow randomly on an unpatterned Ag region of the same sample. Using this approach, spatial organization of ZnO nanorods can be routinely achieved over large areas. Currently clean patterns over a 1 cm×1 cm area with good selectivity are achievable by performing pCP by hand in an ambient environment. The method of the present invention provides the means to precisely control ZnO nanorod placement on a surface. The growth is not a seeded growth; ZnO nanorods grow directly on the Ag surface.

In another embodiment, ZnO nanorods were grown on a Au surface. It is expected that other surfaces, such as surfaces comprising ZnO can also be used.

Density control is an important aspect in spatial organization. Using the SAM solution to cover most of the surface, growth of ZnO nanorods in regular arrays has been achieved. The density of active nucleation regions (N) is determined by soft lithography while the number of nanorods per nucleation region (n) is controlled through solution growth conditions. In one series of embodiments, ZnO 2-micron-diameter dots were formed on a square array with lattice spacings of 5, 10, 15, 20, 30, 40, and 50 μm. Clearly, excellent controlled tuning of nucleation site density over two decades has been demonstrated. For this particular growth chemistry, there are n=46±6 ZnO nanorods per nucleation region since the dot size is much larger than the typical nanorod diameter. However, the crystal morphology can also be controlled, where single crystals of ZnO platelet per 2-μm nucleation region (n=1) were achieved when using zinc nitrate and HMT with an added growth modifier, in this embodiment sodium citrate (0.27 mg/l 5 mL). Positioning individual single crystals of ZnO at precise, predetermined locations have not been achieved previously by either vapor or solution growth. The result demonstrates that judicious choice of pattern size and solution chemistry offers control and flexibility in designing nanomaterials assembly.

Analysis of ZnO nanorods in a nucleation region also indicates that the growth of ZnO nanorods on Ag surfaces is highly oriented, with c-axis (001) normal to the surface. The crystal orientation was further examined using X-ray diffraction. The top panel of FIG. 1 is a θ-2θ scan taken on a patterned region of our ZnO/Ag sample and the bottom panel is the spectrum of randomly oriented ZnO powders. In our samples, only the (002) reflection is seen, indicating the strong c-axis orientation of ZnO nanorods on the Ag substrate. This is further quantified by the full-width-half-maximum of the (002) rocking curve (FIG. 1 inset) of <60. While highly-oriented ZnO nanostructures have been achieved by vapor deposition techniques, this is the first demonstration of oriented ZnO nanorods grown from solution. To confirm the zincite crystal structure, pole figures for ZnO (002) and (101) were collected (not shown). The c- and a-axis lattice constants were measured to be 5.211(3) and 3.257(10) Å, respectively, consistent with values of 5.207 and 3.250 Å for zincite.

Example

The Ag films (1000 Å) were deposited on (001) Si wafers by electron beam evaporation at 5-20 Å/s. The masters for μCP were SU8-5 photoresist patterns on Si substrates. SU8-5 is a multi-functional, highly branched polymeric epoxy resin dissolved in an organic solvent, along with a photo acid generator. The PDMS stamps were made from a silicone elastomeric polymer. To coat the PDMS stamps with SAM molecules, two approaches were used. A drop of SAM solution was deposited on the stamp and quickly blown dry with dry an inert gas with a hand held gun or spun dry on a spin coater. The spinning speed was typically 2000 to 6000 rpm. ZnO nanorods were grown hydrothermally from an aqueous solution of 0.02 M zinc nitrate ($Zn(NO_3)_2 \cdot 6H_2O$) and 0.02 M hexamethylenetetramine at temperatures between 50 and 60° C. for 2 to 6 hours. After growth, the sample was rinsed in deionized water thoroughly and air-dried at room temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method to controllably grow zinc oxide nanorods on a surface, comprising:
   preparing a stamp with relief structures;
   inking said stamp with a solution comprising self-assembled monolayer molecules;
   contacting said stamp to a surface, thereby transferring said self-assembled monolayer molecules to said surface; and
   contacting an aqueous zinc solution to said surface to grow zinc oxide nanorods on said surface.

2. The method of claim 1 wherein said aqueous zinc solution contains a compound for controlling solution pH.

3. The method of claim 2 wherein said compound for controlling solution pH is hexamethylenetetramine.

4. The method of claim 3 wherein said aqueous zinc solution comprise zinc nitrate.

5. The method of claim 3 wherein said aqueous zinc solution further comprises a growth modifier.

6. The method of claim 5 wherein said growth modifier is selected from sodium citrate and diaminopropane.

7. The method of claim 3 wherein said inking is performed by depositing the solution comprising self-assembled monolayer molecules on said stamp and drying the stamp using a dry inert gas.

8. The method of claim 3 wherein said inking is performed by depositing the solution comprising self-assembled monolayer molecules on said stamp and drying the stamp by a spin-dry method.

9. The method of claim 3 wherein said solution comprising self-assembled monolayer molecules is at a concentration of between 1 and 10 mM.

10. The method of claim 3 wherein said surface comprising silver is on a Si substrate.

11. The method of claim 1 wherein said surface comprises a metal selected from silver and gold or a combination thereof.

12. The method of claim 1 wherein said surface comprises zinc oxide.

13. The method of claim 1 wherein said solution comprising self-assembled monolayer molecules comprises compounds selected from the group consisting of 11-mercaptoundecanoic acid, 1-dodecanethiol, 16-mercaptohexadecanoic acid, and 16-hexadecanethiol.

14. The method of claim 1 wherein said solution comprising self-assembled monolayer molecules is a solution comprising acidic self-assembled monolayer molecules.

15. The method of claim 1 where said stamp comprises polydimethylsiloxane.

16. A method to controllably grow zinc oxide nanorods on a surface, comprising:

preparing a polydimethylsiloxane stamp with relief structures;

inking said stamp with a solution comprising 11-mercaptoundecanoic acid dissolved in an alcohol solvent;

contacting said stamp to a surface comprising silver on a Si substrate, thereby transferring said 11-mercaptoundecanoic acid dissolved in an alcohol solvent to said silver surface; and immersing the said surface in an aqueous zinc solution containing hexamethylenetetramine at an elevated temperature to grown zinc oxide nanorods on said surface.

* * * * *